(12) United States Patent
Matthews et al.

(10) Patent No.: US 7,939,141 B2
(45) Date of Patent: May 10, 2011

(54) METHOD OF PRODUCTION OF FLUORINATED CARBON NANOSTRUCTURES

(75) Inventors: Edward Stephen Matthews, Bedfordshire (GB); Xiaoming Duan, Essex (GB); Richard Llewellyn Powell, Chester (GB)

(73) Assignee: C-Tech Innovation Limited, Chester (GB)

( * ) Notice: Subject to any disclaimer, the term of this patent is extended or adjusted under 35 U.S.C. 154(b) by 0 days.

(21) Appl. No.: 12/715,905

(22) Filed: Mar. 2, 2010

(65) Prior Publication Data
US 2010/0155221 A1 Jun. 24, 2010

Related U.S. Application Data

(62) Division of application No. 11/664,651, filed as application No. PCT/GB2005/003808 on Oct. 3, 2005, now Pat. No. 7,700,192.

(30) Foreign Application Priority Data

Oct. 4, 2004 (GB) .................................. 0421999.4

(51) Int. Cl.
C07C 17/007 (2006.01)
B32B 5/16 (2006.01)
(52) U.S. Cl. .................... 427/577; 106/472; 977/773
(58) Field of Classification Search .................. None
See application file for complete search history.

(56) References Cited

U.S. PATENT DOCUMENTS

| 4,438,086 | A | | 3/1984 | Aramaki et al. |
| 4,753,786 | A | | 6/1988 | Watanabe et al. |
| 4,770,940 | A | | 9/1988 | Ovshinsky et al. |
| 4,886,921 | A | | 12/1989 | Nalewajek |
| 4,973,773 | A | * | 11/1990 | Malone .................. 570/155 |
| 5,527,518 | A | | 6/1996 | Lynum et al. |
| 5,611,896 | A | * | 3/1997 | Swanepoel et al. ....... 204/169 |
| 5,698,901 | A | * | 12/1997 | Endo ........................ 257/758 |
| 5,712,062 | A | | 1/1998 | Yamana et al. |
| 5,942,328 | A | | 8/1999 | Grill et al. |
| 5,989,512 | A | | 11/1999 | Lynum et al. |
| 5,997,837 | A | | 12/1999 | Lynum et al. |
| 6,007,954 | A | | 12/1999 | Visser et al. |

(Continued)

FOREIGN PATENT DOCUMENTS
EP 1035569 11/1998
(Continued)

OTHER PUBLICATIONS

Search Report dated Nov. 28, 2005 for PCT Application No. PCT/GB2005/003808, 3 pages.

(Continued)

Primary Examiner — Timothy H Meeks
Assistant Examiner — Joseph Miller, Jr.
(74) Attorney, Agent, or Firm — Haynes and Boone LLP

(57) ABSTRACT

A method for the production of fluorinated carbon nanostructures such as carbon black is disclosed, wherein a plasma is generated in a plasma chamber and a fluorocarbon, or a fluorocarbon containing mixture, is supplied to the plasma to convert at least some of the fluorocarbon into a fluorinated carbon material. Direct pyrolysis of a fluorocarbon, or a mixture containing this, provides a one-step method for producing fluorinated carbon nanostructures with a formula $CF_x$, where $0.06<x<0.15$, the particles having a relatively narrow spread of diameters, and exhibiting excellent hydrophobicity.

16 Claims, 2 Drawing Sheets

U.S. PATENT DOCUMENTS

| | | | |
|---|---|---|---|
| 6,033,979 | A | 3/2000 | Endo |
| 6,068,827 | A | 5/2000 | Lynum et al. |
| 6,068,921 | A | 5/2000 | Yamana et al. |
| 6,337,518 | B1 | 1/2002 | Grill et al. |
| 6,437,201 | B1 | 8/2002 | Ewing et al. |
| 6,534,131 | B1 | 3/2003 | Domoto et al. |
| 6,544,901 | B1 | 4/2003 | Nakase |
| 6,629,419 | B1 | 10/2003 | Powell et al. |
| 6,797,913 | B2 * | 9/2004 | Van Der Walt .......... 219/121.41 |
| 7,228,094 | B2 | 6/2007 | Jaskowiak et al. |
| 7,375,366 | B2 * | 5/2008 | Ohki et al. ...................... 257/10 |
| 7,407,640 | B2 | 8/2008 | Barrera et al. |
| 7,563,542 | B2 | 7/2009 | Yazami et al. |
| 2001/0006849 | A1 * | 7/2001 | Suzuki ......................... 438/710 |
| 2001/0020447 | A1 * | 9/2001 | Murugesh et al. ..... 118/723.001 |
| 2001/0051228 | A1 * | 12/2001 | Sugahara et al. ............. 427/489 |
| 2002/0012844 | A1 | 1/2002 | Gan et al. |
| 2003/0114600 | A1 * | 6/2003 | Van Der Walt ............ 525/331.6 |
| 2004/0023502 | A1 * | 2/2004 | Tzou et al. .................... 438/706 |
| 2004/0161946 | A1 * | 8/2004 | Tsai et al. ..................... 438/778 |
| 2006/0264059 | A1 * | 11/2006 | Kobayashi et al. ........... 438/758 |
| 2009/0137094 | A1 * | 5/2009 | Lee ............................... 438/424 |

FOREIGN PATENT DOCUMENTS

| | | | |
|---|---|---|---|
| EP | 1033746 | A1 | 9/2000 |
| EP | 1035569 | A | 9/2000 |
| JP | 60-013065 | A | 1/1985 |
| JP | 61-030671 | A | 2/1986 |
| JP | 11-126774 | A | 5/1999 |
| WO | WO01/62665 | * | 8/2001 |
| WO | WO2005/017991 | * | 2/2005 |

OTHER PUBLICATIONS

Search Report dated Feb. 7, 2006 for Great Britain Application No. 0421999.4, 2 pages.

Tressaud, et al., "Fluorinated carbon blacks: influence of the morphology of the starting material on the fluorination mechanism", Carbon, vol. 40, No. 2, Feb. 2002, pp. 214-220.

Mickelson et al., "Fluorination of single-wall carbon nanotubes", Chemical Physics Letters, 296 (1998) 188-194.

Brzhezinskaya et al., "Characterization of fluorinated multiwalled carbon nanotubes with X-ray absorption, photoelectron and emission spectroscopies", Applied Physics A. (2009) 94: 445-448.

UK Intellectual Property Office, Preliminary Examination Report of Feb. 12, 2010 and Response of Aug. 12, 2010, UK Patent Application No. 0421999.4, 7 pages.

European Patent Office, Examination Report of Jan. 13, 2010 and Response of Oct. 25, 2010, European Patent Application No. 05789145.9, 9 pages.

UK Intellectual Property Office, Examination Report of Sep. 24, 2010 and Response of Nov. 18, 2010, UK Patent Application No. 0421999.4, 15 pages.

European Patent Office, Examination Report of Aug. 2, 2007 and Response of Mar. 14, 2008, European Patent Application No. 05789145.9, 12 pages.

* cited by examiner

METHOD OF PRODUCTION OF FLUORINATED CARBON NANOSTRUCTURES

This application is a continuation of U.S. patent application Ser. No. 11/664,651 filed Apr. 4, 2007, which was nationalized from PCT Application No. PCT/GB2005/003808 filed Oct. 3, 2005, and claims the priority of Great Britain Patent Application No. 0421999.4 filed Oct. 4, 2004. The entirety of the disclosures of U.S. patent application Ser. No. 11/664,651, PCT Application No. PCT/GB2005/003808, and Great Britain Patent Application No. 0421999.4 are hereby incorporated herein by reference.

TECHNICAL FIELD

This invention relates to a method of production of fluorinated carbon nanostructures such as, for example, carbon black.

BACKGROUND

Fluorinated carbons or graphite fluorides have a chemical formula $CF_x$, where, typically, $0<x<1.14$. Most techniques for the production of fluorinated carbons employ direct fluorination of graphites or petroleum cokes at 600-900 k, with properties dependent upon the structure and antecedents of the starting material that is used. Depending upon the fluorine content, $CF_x$ exhibits a wide range of electrical resistivities, has a low coefficient of friction, a low surface free energy and a range of colour from black ($x<0.8$) to white ($x>0.95$). Graphite fluorides consist of layers of $(CF)_n$ puckered in an infinite array of cyclohexane chairs.

The excellent lubricity and water and oil repellency properties of graphite fluorides have been utilised in various composite materials such as plastics, organic and aqueous liquids, and also as cathodic materials in high energy density lithium batteries. For such applications, the dispersability of graphite fluoride is an important factor; since dispersability is primarily dependent upon particle size, there is a requirement for nano-sized particles of fluorinated carbon.

An alternative approach to the production of fluorinated carbons, although one which has been much less extensively used, is to fluorinate carbon black. Carbon black is a well known substance formed of spheroidally-shaped particles grouped together into chains or clusters known as aggregates. Carbon black is formed by the dissociation of hydrocarbons and finds use as a filler for rubber products, in the manufacture of printing inks, tinting, and in paper and fibre colourings. Traditional methods for the production of carbon black (such as lamp black, furnace black and gas black) relied upon partial combustion of petrochemical and coal tar oils. Over recent decades, however, plasma systems have also been employed as they are typically more controllable, efficient and environmentally friendly. Moreover, unique properties and characteristics are seen in carbon blacks generated by a plasma process. U.S. Pat. Nos. 5,527,518, 5,989,512, 5,997,837 and 6,068,827 describe examples of the generation of carbon blacks with a plasma torch, using a quenching technique which allows the size of carbon black particles to be controlled and permits a 100% yield to be obtained.

Production of fluorinated carbons on an industrial scale is difficult. The conditions must be strictly controlled and for direct fluorination, long reaction times are required in order to completely fluorinate a carbon material. This results in the use of large quantities of expensive fluorine. The yield is in any event low and large quantities of gaseous by-product are formed. Plasma fluorination techniques have been employed on a limited scale, but require expensive equipment, that is time-consuming to operate. The requirements for a vacuum in the plasma generation techniques also limit such processes to small batches which in turn makes industrial production difficult.

It is an object of the present invention to provide an improved process for the production of fluorinated carbons and in particular for the production of fluorinated carbon black.

According to the present invention, there is provided a process for producing a fluorinated carbon material comprising the steps of generating a plasma in a plasma chamber; and supplying a fluorocarbon or fluorocarbon containing mixture to the plasma whereby at least some of the fluorocarbon transforms to a fluorinated carbon material.

Direct pyrolysis of a fluorocarbon or fluorocarbon containing mixture provides a 'one-step' process which avoids the problems of the two-step prior art processes, particularly in that the overall production time is reduced and that large amounts of fluorine gas are not now needed. A perfluorinated or partially fluorinated fluorocarbon is typically employed as a feedstock with a nitrogen or argon plasma gas supplied to form an atmospheric pressure plasma. By the term "fluorocarbon" is meant any of a number of organic compounds analogous to hydrocarbons, where either some or all of the hydrogen atoms have been replaced by fluorine. In preference, therefore, hydrofluorocarbons having both hydrogen and fluorine atoms as well as carbon may be used as a feedstock.

The resultant product has the form $(CF_x)$, where x is $\leq 0.8$, preferably from 0.05 and 0.30, and more preferably from 0.06 to 0.15. The fluorinated carbon is similar in appearance to carbon black; the particles have a relatively narrow spread of diameters (the mean particle diameter is in the range of from 10 to 100 nm, preferably 15 to 60 nm, and more preferably from 15 to 50 nm, and at least 90% and preferably substantially all of the particles have a diameter falling within the range of from 15 to 50 nm). The particles also exhibit excellent hydrophobicity when used as a substrate coating.

In a preferred embodiment, the fluorinated nanocarbon material may be doped with other elements such as chlorine, oxygen or nitrogen. The invention accordingly extends, in a preferred embodiment, to a fluorinated carbon material thus doped.

The fluorinated carbon produced in accordance with the invention finds a wide range of applications including, but not limited to, electrodes for high energy lithium cells, an additive for a photocopy toner, an ink, a super-hydrophobic coating or a filler for a fluoropolymer.

BRIEF DESCRIPTION OF THE DRAWINGS

The invention may be put into practice in a number of ways, one of which will now be described by way of example only and with reference to the accompanying Figures in which.

DETAILED DESCRIPTION

In one exemplary aspect, the present disclosure is directed to a process for producing a fluorinated carbon material. The process includes the steps of generating a plasma in a plasma chamber and supplying a fluorocarbon or a fluorocarbon containing mixture to the plasma whereby at least some of the fluorocarbon transforms to a fluorinated carbon material.

In some exemplary aspects, the step of generating a plasma comprises includes the steps of supplying a plasma-forming fluid to an input of the plasma chamber; flowing the plasma-forming fluid to a plasma region of the plasma chamber; and supplying electromagnetic energy to the plasma chamber so as to maintain the said plasma from the plasma-forming fluid, in the said plasma region. In some aspects, the step of generating a plasma further comprises concentrating the electromagnetic field so as to establish the plasma. In some aspects, the step of flowing the plasma forming fluid to the plasma region comprises passing the plasma-forming fluid through a fluid manifold, which manifold is adapted to introduce vortical motion into the plasma-forming fluid downstream of the plasma chamber input. In some aspects, the plasma gas comprises or consists of an inert gas, and the plasma gas comprises or consists of helium and/or argon. In some aspects, the plasma gas comprises or consists of nitrogen or a nitrogen-containing gas.

In some aspects, the electromagnetic energy has a frequency in the RF or microwave range, and wherein the output power is between 2.5 and 3.5 kW. In some aspects, the plasma forming fluid is supplied at a rate of between 20 and 40 liters/minute.

In some aspects, the process includes mixing the supplied fluorocarbon or fluorocarbon-containing mixture with the plasma in a mixing chamber forming a part of the plasma chamber.

In some aspects of the process, the fluorocarbon is perfluorinated or partially fluorinated. In one aspect, the fluorocarbon is or may comprise 1,1,1,2-tetrafluoroethane (HFC-134a), hexafluorobenzene ($C_6F_6$) or perfluoromethylcyclohexane ($C_7F_{14}$), including mixtures of two or more thereof.

In some aspects, the process includes maintaining the plasma at a pressure which is substantially at or above atmospheric pressure.

In some aspects, the fluorinated carbon material comprises or consists of fluorinated carbon black (FCB).

In some aspects, the fluorinated carbon material has the general formula $CF_x$, where x is $\leq 0.8$. In one aspect, x is between 0.05 and 0.30, and x may be between 0.06 and 0.15.

In some aspects, the fluorinated carbon material is in the form of nanometer sized particles and/or agglomerates thereof.

In some aspects, the fluorinated carbon material also includes a dopant selected from one or more of chlorine, nitrogen and oxygen.

Figure 1:
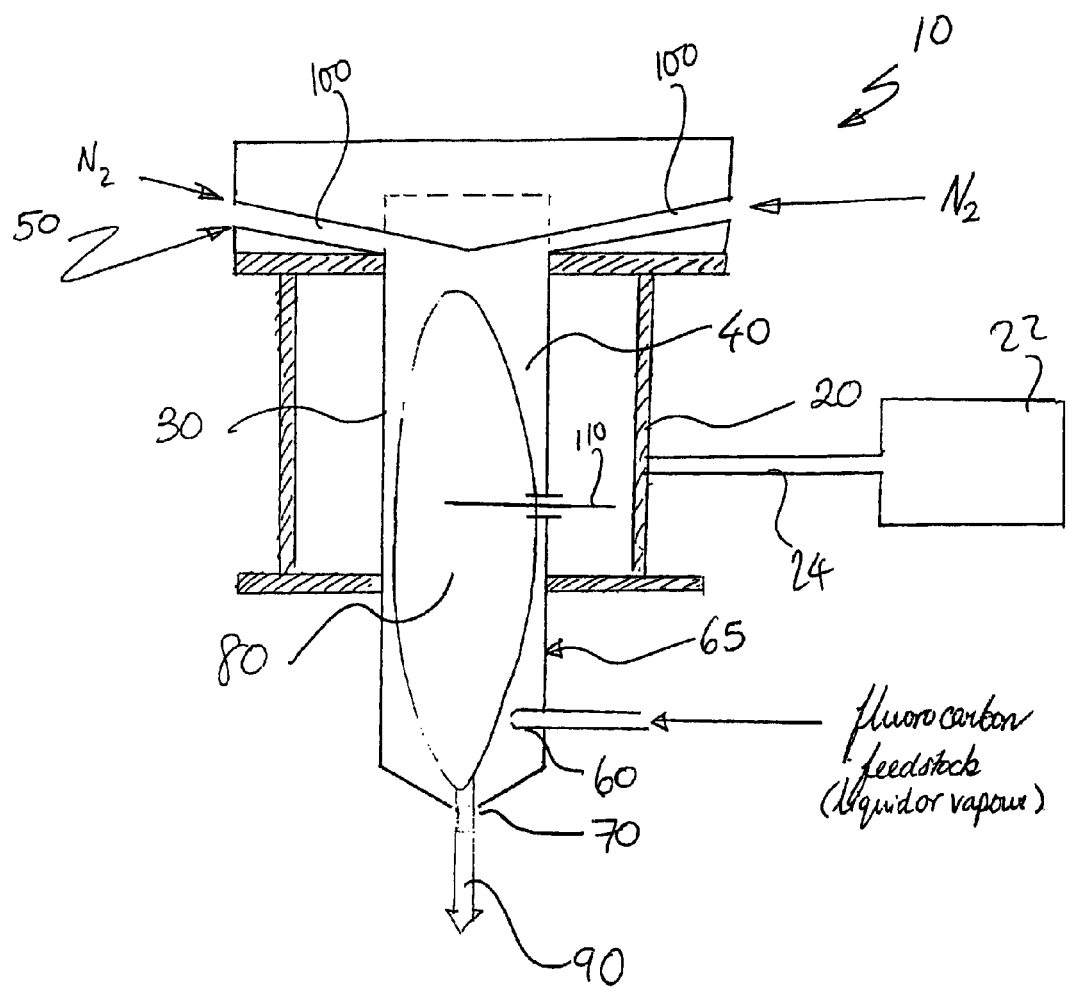
FIG. 1 shows, schematically, a side-sectional view of a microwave plasma apparatus for generation of fluorinated carbon nanostructures in accordance with an embodiment of the invention.

Referring first to FIG. 1, an atmospheric pressure non-equilibrium plasma (APNEP) apparatus 10 is shown. The apparatus 10 includes a microwave cavity 20 which is coupled to a microwave source 22 by a wave guide 24. The microwave source is, in preference, a variable power source providing up to, for example, 5 kW. Maximum frequency is typically 2.45 GHz, although operation of the plasma at other frequencies is also contemplated, such as around 900 MHz. RF frequencies may also be used. Moreover, pulsed microwave sources may be employed in the alternative.

Within the microwave cavity 20 is a reaction tube 30 which defines a plasma cavity 40. The reaction tube 30 is preferably formed from a quartz material although a non-susceptible ceramic material such as alumina could also be used. At the upper end of the reaction tube 30, as seen in FIG. 1, a gas inlet manifold 50 is provided. The preferred configuration of this manifold, and its purpose, will be described in further detail below.

A feedstock injection port 60 is provided towards the other end of the reaction tube 30, distal from the gas inlet manifold 50 and allows injection of feedstock into a mixing zone 65 which forms a part of the plasma cavity 40. It is, however, to be understood that the feedstock can be supplied instead further up the reaction tube 30 and indeed as a mixture along with the plasma gas via the gas inlet manifold 50. The reaction tube 30 has an opening defined by an exit nozzle 70. The system is electrodeless and a plasma is initiated with a graphite rod (not shown). The diffuse, glowing plasma is homogeneous and its shape can be changed according to the reaction tube 30. The volume of the plasma can be controlled by adjustment of the input power. Plasma shape and volume are also affected by other factors such as power, flow rate, flow pattern, plasma gas and pressure changes.

The schematic arrangement of FIG. 1 is conceptually similar to, and operates according to the same principles as, the arrangement described in our earlier Application No. PCT/GB95/01628, published as WO-A-96/02934, although the nozzle 70, gas inlet manifold 50 and the mixing zone 65 differ from the arrangement shown therein. A further detailed discussion of the physical principles underlying the operation of the arrangement of FIG. 1 will not, therefore, be given.

Figure 2:
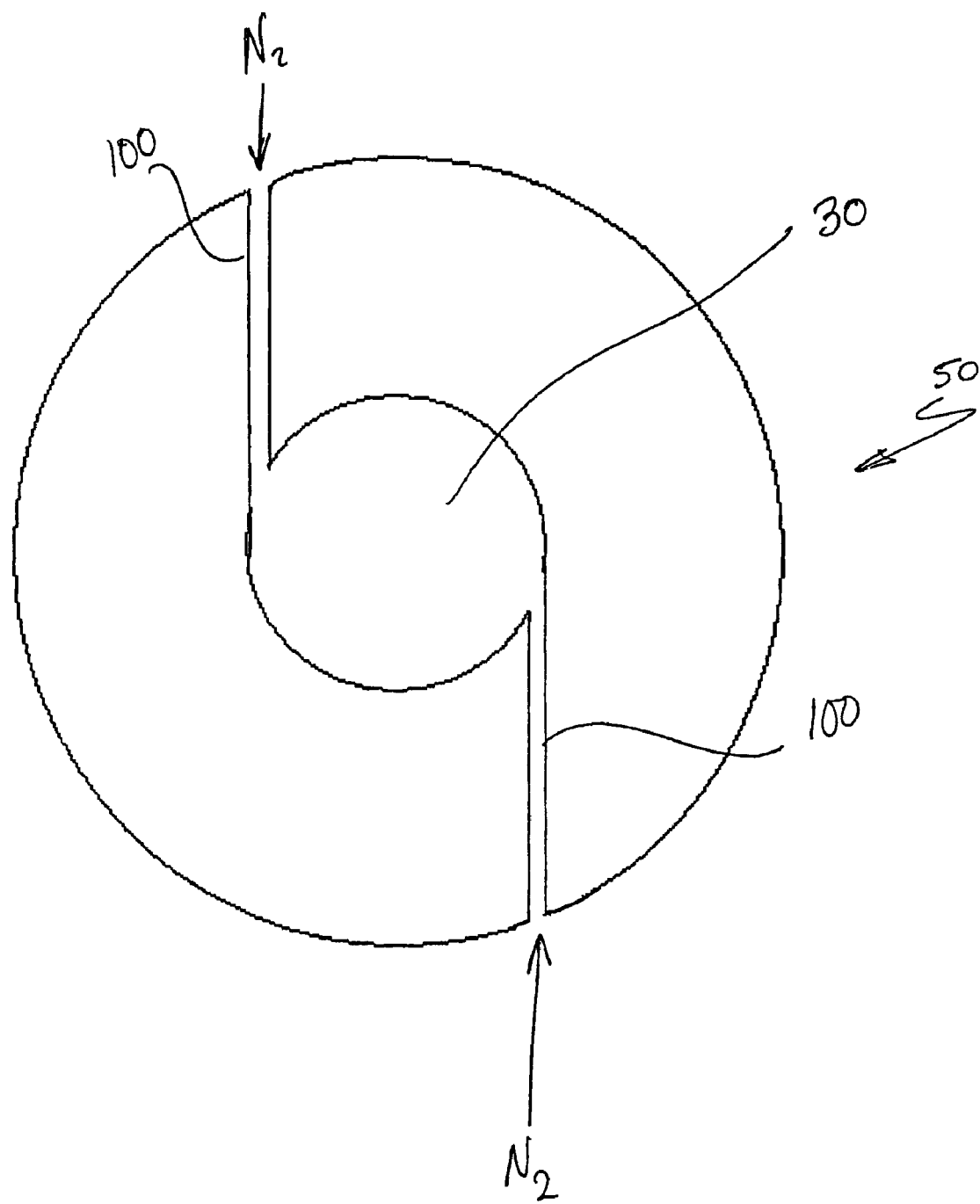
FIG. 2 shows a plan view of the upper part of the microwave plasma apparatus of FIG. 1.

In operation, a small amount of plasma-forming gas (in the described embodiment, this is nitrogen, although other gases can be used) is introduced into the reaction tube 30 via the gas inlet manifold 50. The gas inlet manifold 50 is, as better seen in FIG. 2, formed so as to inject the plasma gas tangentially to the diameter of the reaction tube 30 by offsetting gas inlets 100 relative to the reaction tube 30. This causes the plasma gas to rotate or swirl within the reaction tube in a vortex. This in turn prevents the silica reaction tube 30 from overheating, at which point it can become absorbent to microwave energy leading to thermal runaway. As described in our co-pending application, entitled "Atmospheric Pressure Microwave Plasma Apparatus", filed on even date, the swirled flow also allows the plasma to run at very low flow rates, prevents the plasma from being blown out at very high flow rates, and may lead to increased uniformity of temperature and particle size.

The microwave source 22 is then activated and a graphite lighting rod 110 is inserted through an aperture located midway along the length of the reaction tube, as described in the above-referenced WO-A-96/02934. Once the plasma has been struck, the rod is removed as it is not necessary to maintain the plasma. Insertion and withdrawal of the rod may be automated. Alternative methods of igniting the plasma, such as the use of a pair of electrodes energised by a Tesla coil, or even reducing the pressure in the chamber (which causes spontaneous ignition) may be employed.

The flow rate of the nitrogen plasma gas is then increased and a body of plasma 80 is established which, at its broadest point, fills the reaction tube 30. A plasma "jet" 90 extrudes through the exit nozzle 70. The nozzle 70 has a restricted outlet which increases the speed of the jet 90.

The arrangement of FIG. 1 permits relatively high plasma gas flow rates of up to 200 l/min, although, for the production of fluorinated carbons, a flow rate not exceeding 40 l/min has been found preferable. The stability, size and shape of the body of plasma 80, as well as the dimensions of the plasma jet 90, are controlled by the power of the microwave source 22 and the flow rate of the plasma gas. The 'swirled' input also lends stability, allowing higher and lower flow rates.

A variety of feedstocks have been employed, and these are set out in more detail in the following Examples. Broadly, these fall into two categories, liquid and gas. For liquid feedstocks, a liquid reservoir such as a Drechsel bottle may be used. In preference, this is attached to the feedstock injection port 60 and contains 10 ml of liquid feedstock. Plasma gas (in this case, nitrogen) is tapped off from the main plasma gas supply to the gas inlet manifold 50 and bubbled through the liquid feedstock in the Drechsel bottle. The vapour-saturated gas is thus fed via the feedstock injection port 60 directly into the mixing zone 65 of the reaction tube 30, adjacent the nozzle 70. Because the plasma gas in the body of the plasma 80 is swirling (due to the gas inlet manifold 50), the injected feedstock is well dispersed and activated. Typical flow rates of feedstock range from 0.5 l/min up to 2.0 l/min, controlled by a gas flow meter (not shown).

Although a liquid reservoir is described, it will be understood that other forms of introduction of liquid precursors can be used, including other vapour pressure devices, direct liquid injection, an atomiser nozzle, and evaporation from a hot surface.

For gaseous feedstocks, a mass flow controller (again, not shown) is used to control the flow rate of gaseous feedstock into the reaction tube 30. The mass flow controller is placed in line between a supply of gaseous feedstock and the feedstock injection port 60. Flow rates up to 8.0 l/min have been employed. Of course, the feedstock injection point can be at any point in the reaction tube and nozzle, or even below the nozzle.

Solid precursors can also be introduced: as powders, or as larger pieces which decompose thermally or chemically in the plasma.

During operation, a considerable amount of heat is generated. In the arrangement shown in FIG. 1, cooling is not normally necessary. However, in certain circumstances, such as when the apparatus is run "upside down" (i.e., with the nozzle at the top of the reaction tube 30 so that the plasma jet exits upwards), the top flange can become very hot. Some degree of cooling may be provided by an enclosed aluminium water jacket which may be fitted to the nozzle 70.

Resultant fluorinated carbon material is collected both from deposits upon the interior surface of the exit nozzle 70, and also from the plasma jet 90 itself by use of a bag filter attached to the outer rim of the exit nozzle 70. Because of the generally downward direction of flow of the plasma, there is no deposition inside the main body of the reaction tube 30 (although 'upside down', horizontal or other orientations are possible).

Having described the apparatus used to generate the fluorinated carbons, experimental results will now be set out by way of Examples:

EXAMPLE 1

1,1,1,2-tetrafluoroethane (HFC-134a)

The well known hydrofluorocarbon refrigerant HFC-134a was supplied as a compressed gas to the feedstock injection port 60 of the apparatus 10 of FIG. 1. In a first method, nitrogen was employed as the plasma gas with a flow rate, once the plasma had been established, of 20-40 l/min. The microwave power was 2.77 kW and the flow rate of HFC-134a was between 0.7 liter and 2.5 l/min.

In a second method, a nitrogen/oxygen mixture was instead used as a plasma gas with a flow rate of 40 l/min for the nitrogen and between 2.0 and 4.0 liters per minute for the oxygen. The microwave power was again 2.77 kW but this time, the flow rate of HFC-134a was 1.5 l/min.

The collected product was analysed in accordance with a number of different analytical techniques, and a non-exhaustive list includes microanalysis, secondary electron microscopy (SEM), transmission electron microscopy (TEM), contact angle measurements, nitrogen adsorption, mercury porosimetry, solid state nuclear magnetic resonance (NMR), thermogravimetric analysis (TGA), X-ray photoelectron spectroscopy (XPS) and solvent extraction. Table 1 details the results of microanalysis on powders extracted from the apparatus 10 of FIG. 1, at the nozzle (samples 1 to 19), 40 mm downstream of the nozzle 70 (samples 20-23) from the bag filter (samples 24 and 25), and from the underside of the nozzle (sample 26). All samples were black in colour.

TABLE 1

| | APNP Conditions | | | | | Elemental Composition (%) | | | |
|---|---|---|---|---|---|---|---|---|---|
| Ref | Power (kW) | Plasma Gas | Flow Rate (l/min) | Feedstock Flow Rate (l/min) | Sample Collection | C | F | H | N |
| 1 | 1.38 | $N_2$ | 30 | 2.0 | Nozzle | 74.5 | 19.2 | <0.1 | 1.5 |
| 2 | 1.84 | $N_2$ | 30 | 2.0 | Nozzle | 74.2 | 18.8 | <0.1 | 1.3 |
| 3 | 2.30 | $N_2$ | 30 | 2.0 | Nozzle | 75.3 | 19.4 | <0.1 | 1.3 |
| 4 | 2.77 | $N_2$ | 30 | 2.0 | Nozzle | 76.3 | 20.4 | <0.1 | 1.5 |
| 5 | 3.68 | $N_2$ | 30 | 2.0 | Nozzle | 77.3 | 20.5 | <0.1 | 2.1 |
| 6 | 2.77 | $N_2$ | 20 | 2.0 | Nozzle | 76.1 | 20.5 | <0.1 | 0.9 |
| 7 | 2.77 | $N_2$ | 25 | 2.0 | Nozzle | 75.9 | 20.1 | <0.1 | 1.4 |
| 8 | 2.77 | $N_2$ | 30 | 2.0 | Nozzle | 76.3 | 20.4 | <0.1 | 1.5 |
| 9 | 2.77 | $N_2$ | 35 | 2.0 | Nozzle | 76.9 | 21.1 | <0.1 | 1.4 |
| 10 | 2.77 | $N_2$ | 40 | 2.0 | Nozzle | 77.0 | 20.5 | <0.1 | 1.0 |
| 11 | 2.77 | $N_2$ | 40 | 1.5 | Nozzle | 76.8 | 22.0 | <0.1 | 1.1 |
| 12 | 2.77 | $N_2/O_2$ | 40/2.0 | 1.5 | Nozzle | 79.4 | 19.1 | <0.1 | 1.2 |
| 13 | 2.77 | $N_2/O_2$ | 40/2.0 | 1.5 | Nozzle | 80.8 | 17.5 | <0.1 | 1.7 |
| 14 | 2.77 | $N_2$ | 40 | 0.7 | Nozzle | 75.9 | 23.0 | <0.1 | 0.9 |
| 15 | 2.77 | $N_2$ | 40 | 1.0 | Nozzle | 77.7 | 21.8 | <0.1 | 1.0 |
| 16 | 2.77 | $N_2$ | 40 | 1.5 | Nozzle | 76.7 | 20.2 | <0.1 | 1.1 |
| 17 | 2.77 | $N_2$ | 40 | 2.0 | Nozzle | 77.0 | 20.5 | <0.1 | 1.0 |
| 18 | 2.77 | $N_2$ | 40 | 2.5 | Nozzle | 77.4 | 20.1 | <0.1 | 1.1 |
| 19 | 2.77 | $N_2$ | 40 | 3.0 | Nozzle | 76.9 | 19.7 | <0.1 | 1.1 |
| 20 | 2.77 | $N_2$ | 40 | 0.7 | Downstream (40 mm) | 86.1 | 12.8 | <0.1 | 1.5 |
| 21 | 2.77 | $N_2$ | 40 | 0.7 | Downstream (40 mm) | 87.0 | 11.3 | <0.1 | 1.6 |
| 22 | 2.77 | $N_2$ | 40 | 1.0 | Downstream (40 mm) | 87.1 | 11.7 | <0.1 | 1.5 |

TABLE 1-continued

| | APNP Conditions | | | | Elemental Composition (%) | | | |
|---|---|---|---|---|---|---|---|---|
| Ref | Power (kW) | Plasma Gas | Flow Rate (l/min) | Feedstock Flow Rate (l/min) | Sample Collection | C | F | H | N |
| 23 | 2.77 | $N_2$ | 40 | 0.7 | Downstream (70 mm) | 93.6 | 4.9 | <0.1 | 1.5 |
| 24 | 2.77 | $N_2$ | 30 | 2.0 | Bag Filter | 85.9 | 13.4 | <0.1 | 1.6 |
| 25 | 2.77 | $N_2$ | 30 | 2.0 | Bag Filter | 86.1 | 13.3 | <0.1 | 1.5 |
| 26 | 2.77 | $N_2$ | 30 | 2.0 | Nozzle underside | 79.1 | 18.5 | <0.1 | 1.7 |

A pre-mixed nitrogen-oxygen plasma gas was employed for samples 12 and 13. This was to determine the effect of the presence of oxygen on the thermal decomposition of the HFC-134a feedstock.

Table 2 below lists the mean diameter and range of diameters, as well as the specific surface area defined as 6/(density×particle diameter). In each case, the plasma gas was nitrogen at a flow rate of 40 l/min, the microwave power was 2.77 kW, and various flow rates for the HFC-134a flow rate were employed.

TABLE 2

| HFC-134a Flow Rate (l/min) | Mean Diameter (nm) | Range (nm) | Surface Area ($m^2$/g) |
|---|---|---|---|
| 0.7 | 27 | 24-28 | 101.0 |
| 1.0 | 39 | 36-43 | 69.9 |
| 1.5 | 36 | 30-40 | 75.8 |
| 2.5 | 31 | 30-37 | 88.0 |

TEM studies also indicate that the particles are spheroidal and are fused together into highly developed, chained aggregates, resembling furnace blacks. The relatively narrow range of diameters is of particular note (a furnace grade carbon black with a mean diameter of 80 nm might show a spread of up to 160 nm in diameters).

Contact angle measurements were carried out on substrates coated by powder from the plasma jet 90, using water. In each case, the substrate was 40 mm from the nozzle 70. Table 3 shows the mean contact angle in degrees, for a range of feedstock flow rates.

TABLE 3

| APNEP Operating Parameters | | | | |
|---|---|---|---|---|
| M/W Power (kW) | $N_2$ Flow Rate (l/min) | Feedstock Flow Rate (l/min) | Substrate Distance (mm) | Mean Contact Angle (°) |
| 2.77 | 40 | 0.7 | 40 | 164.2 |
| 2.77 | 40 | 1.0 | 40 | 161.5 |
| 2.77 | 40 | 1.5 | 40 | 166.3 |
| 2.77 | 40 | 2.5 | 40 | 160.0 |
| 2.77 | 28 | 1.5 | 40 | 161.0 |
| 2.77 | 20 | 1.5 | 40 | 162.2 |
| | | | Mean: - | 162.5 |

The overall mean contact angle for the various feedstock flow rates is seen to be over 162°. This is significantly higher than the contact angles for a range of typical water contact angles on graphite fluorides and other hydrophobic materials as listed in Table 4 below.

TABLE 4

| Sample | Contact Angle (°) |
|---|---|
| $(CF)_n$, flake | 117 ± 11 |
| $(C_2F)_n$, flake | 116 ± 10 |
| $(CF)_n$, tablet | 143 ± 3 |
| $(C_2F)_n$, tablet | 141 ± 6 |
| Graphite, flake | 96 ± 4 |
| PTFE, tablet | 109 ± 3 |

The high hydrophobicity of the fluorinated carbon, when coated onto a substrate, or other surface and produced via the process described above is thought to be a result of the physical nature of the resulting material, as well as the presence of fluorine bound as CF, $CF_2$ and $CF_3$. The presence of bound fluorine was confirmed via XPS.

Finally, nitrogen adsorption measurements were carried out on 0.3984 g of material, at 77.35K. The surface area of the particles was determined using both a single point method, and the well known BET method (Brunauer, Emmett and Teller). The specific surface area, S is given by S=($VA_m$×N× A)/$M_v$, where $VA_m$ is the volume of the adsorbed manslayer, N is Avogadro's number, A is the molecular cross-sectional area of nitrogen (0.162 $nm^2$) and $M_v$ is the molar volume. For HFC-134a, the BET surface area was calculated to be 93.69 $m^2$/g+/−0.442 $m^2$/g.

Thus, it may be concluded that the supply of partially fluorinated feedstock in the form of HFC-134a produces, over a range of conditions, fluorinated carbon black (FCB) having a spheroidal, agglomerated structure with a relatively narrow range of particle diameters around 30 nm, with around 28% fluorine, and with very high hydrophobicity when coated onto a substrate. The production of this FCB can be "switched off" for a given feedstock and plasma flow rate by reducing the microwave energy. This leads to a colour change in the jet from a bright sparkly yellow, where FCB is produced, to a light blue where no or minimal FCB is obtained. The transition from yellow to blue can be used to indicate required power.

Experiments were also carried out using argon as a plasma gas (with a flow rate of 40 l/min) and with HFC-134a as a feedstock, at lower flow rates of between 0.5 and 1.5 liters/minute. The microwave power was 2.77 kW.

EXAMPLE 2

Hexafluorobenzene ($C_6F_6$) Feedstock

Liquid hexafluorobenzene was supplied to the feedstock injection port 60 (FIG. 1) at a rate of 1 l/min (although rates up to 2 l/min were tried). The microwave power was varied between 3.22 and 3.91 kW. Nitrogen was employed as a plasma gas in five samples with varying flow rates between 24 and 36 l/min. Argon was also employed in one sample, at a flow rate of 40 liters/minute (although flow rates as low as 36 l/min were tried as well). The results of a microanalysis performed on the resultant fluorinated carbon, in both cases collected from the bag filter downstream of the nozzle 70, are shown in Table 5 below.

TABLE 5

| | APNEP Conditions | | | | Elemental Composition (%) | | | |
|---|---|---|---|---|---|---|---|---|
| Ref | Power (kW) | Plasma Gas | Flow Rate (l/min) | Feedstock Flow Rate (l/min) | Sample Collection | C | F | H | N |
| 1 | 3.22 | $N_2$ | 28 | 1.0 | Nozzle | 76.1 | 21.3 | <0.1 | 1.8 |
| 2 | 3.91 | $N_2$ | 36 | 1.0 | Nozzle | 75.5 | 22.4 | <0.1 | 2.0 |
| 3 | 3.91 | Ar | 40 | 1.0 | Nozzle | 67.0 | 30.9 | <0.1 | 0.0 |
| 4 | 3.22 | $N_2$ | 28 | 1.0 | Bag Filter | 91.7 | 6.3 | <0.1 | 1.0 |
| 5 | 3.68 | $N_2$ | 24 | 1.0 | Bag Filter | 89.5 | 8.3 | <0.1 | 1.2 |
| 6 | 3.91 | $N_2$ | 36 | 1.0 | Bag Filter | 86.1 | 9.9 | <0.1 | 2.0 |

It will be seen that the fluorinated carbon has a general composition $(CF_x)_n$, where $0.07<x<0.46$. Each of these six samples was black in colour and similar in appearance (to the naked eye) to the fluorinated carbons produced using the HFC-134a feedstock material outlined in Example 1 above.

TEM studies of a powder sample show a range of particle sizes, measured directly off the TEM micrograph, between 25 nm and 65 nm. The particles are still spherical in shape but the aggregate structures are not confined to particles of the same diameter. Additionally, there is a high degree of aggregation with dense packing of particles throughout the structure. Each individual particle appears to have a "turbostratic" structure.

Nitrogen adsorption measurements were carried out on 0.216 g of material, and the specific surface area, again calculated using the BET (Brunauer, Emmett and Teller) method from the nitrogen adsorption data, was 336.82 m²/g+/−3.46 m²/g.

EXAMPLE 3

Perfluoromethylcyclohexane ($C_7F_{14}$) Feedstock

Perfluoromethylcyclohexane was applied to the feedstock injection port 60 as a liquid, with a nitrogen plasma gas. A range of nitrogen plasma gas flow rates between 20 and 40 liters/minute and feedstock flow rates between 1 and 3 liters per minute were employed, and samples were collected both from the nozzle 70 and from the bag filter downstream of the nozzle 70. The results of an elemental analysis are shown in Table 6 below.

TABLE 6

| | APNEP Conditions | | | | Elemental Composition (%) | | | |
|---|---|---|---|---|---|---|---|---|
| Ref | Power (kW) | Plasma Gas | Flow Rate (l/min) | Feedstock Flow Rate (l/min) | Sample Collection | C | F | H | N |
| 1 | 1.84 | $N_2$ | 40 | 2.0 | Nozzle | 73.8 | 22.1 | <0.1 | 0.9 |
| 2 | 2.77 | $N_2$ | 40 | 2.0 | Nozzle | 73.0 | 21.4 | <0.1 | 1.1 |
| 3 | 3.68 | $N_2$ | 40 | 2.0 | Nozzle | 72.1 | 23.1 | <0.1 | 1.0 |
| 4 | 2.77 | $N_2$ | 20 | 2.0 | Nozzle | 74.1 | 20.9 | <0.1 | 0.8 |
| 5 | 2.77 | $N_2$ | 30 | 2.0 | Nozzle | 73.7 | 21.5 | <0.1 | 1.0 |
| [2] | 2.77 | $N_2$ | 40 | 2.0 | Nozzle | 73.0 | 21.4 | <0.1 | 1.1 |
| 6 | 2.77 | $N_2$ | 40 | 3.0 | Nozzle | 72.6 | 22.7 | <0.1 | 1.2 |
| 7 | 2.77 | $N_2$ | 40 | 3.5 | Nozzle | 73.4 | 21.9 | <0.1 | 1.1 |
| 8 | 2.77 | $N_2$ | 30 | 2.0 | Bag Filter | 84.1 | 10.0 | <0.1 | 2.2 |
| 9 | 2.77 | $N_2$ | 40 | 2.0 | Bag Filter | 85.1 | 9.2 | <0.1 | 1.9 |
| 10 | 2.77 | $N_2$ | 30 | 1.4 | Bag Filter | 84.4 | 10.2 | <0.1 | 1.8 |
| 11 | 2.77 | $N_2$ | 40 | 2.0 | Downstream 40 mm) | 86.2 | 10.9 | <0.1 | 1.7 |
| 12 | 2.77 | $N_2$ | 40 | 2.0 | Downstream 40 mm) | 95.1 | 4.1 | <0.1 | 1.7 |

Again, it will be seen that the general structure of the resultant fluorinated carbon material is $(CF_x)_n$, where $0.04<x<0.32$. It will also be noted that the material collected at the nozzle in general has a different F and a different N content to the material collected at the bag filter.

TEM images were acquired of perfluoromethylcyclohexane-derived powder prepared under different conditions as set out in Table 7 below.

TABLE 7

| APNEP Conditions | | | TEM | |
|---|---|---|---|---|
| Power (kW) | Nitrogen Flow Rate (l/min) | Feedstock Flow Rate (l/min) | Grid Type | Preparation Method |
| 2.77 | 40 | 4.0 | Film | Deposition |
| 2.77 | 40 | 5.0 | Film | Deposition |
| 2.77 | 40 | 3.0 | Holey | Evaporation |

The aggregate structure is similar to that seen for HFC-134a and hexafluorobenzene. Spherical particles are fused into tangle chains or aggregates. Again, the individual particles appear to be turbostratic in structure.

Particle size measurements were, in this case, performed directly by measurement of the TEM micrograph, or using image analysis software. Table 8 shows the mean diameters, for samples extracted both from the nozzle and the bag filter downstream of the nozzle.

TABLE 8

| APNEP Conditions | | | | Particle Size Distribution | | | |
|---|---|---|---|---|---|---|---|
| Power (kW) | Nitrogen Flow Rate (l/min) | Feedstock Flow Rate (l/min) | Sampling Point | Number of Particles (n) | Mean Diameter (nm) | Range (nm) | Standard Deviation (nm) |
| 2.77 | 40 | 3.0 | Nozzle | 57 | 44 | 37-47 | 2.33 |
| 2.77 | 30 | 2.0 | Plasma Jet | 10 | 30 | 27-33 | |
| 2.77 | 40 | 2.0 | Plasma Jet | 28 | 23 | 19-25 | 1.82 |

As with the HFC-134a-derived fluorinated carbons, contact angles were measured for a range of feedstock flow rates, again by deposition of the fluorinated carbon onto a substrate 40 mm below the nozzle 70. The mean contact angle in each case is shown in Table 9.

TABLE 9

| APNEP Operating Conditions | | | | |
|---|---|---|---|---|
| Power (kW) | $N_2$ Flow Rate (l/min) | Feedstock Flow Rate (l/min) | Substrate Distance (mm) | Mean Contact Angle (°) |
| 2.77 | 40 | 3.0 | 40 | 165.3 |
| 2.77 | 40 | 4.0 | 40 | 167.2 |
| 2.77 | 40 | 5.0 | 40 | 161.4 |
| | | | Mean:- | 164.6 |

The overall mean contact angle of the three samples examined was over 164°, which again is significantly higher than the contact angles for the materials shown in Table 4 above.

Finally, nitrogen adsorption measurements were carried out on 0.3069 g of sample obtained using the perfluoromethylcyclohexane feedstock. The BET method was employed to obtain a specific surface area of 115.07 $m^2$/g+/−0.43 $m^2$/g. As with the other feedstocks examined, the fluorine appears to be bound into the structure as CF, $CF_2$ and $CF_3$.

Although the foregoing examples all employ fluorocarbon feedstocks, it will be appreciated that the apparatus of FIG. 1 is likewise suitable for the production of carbon blacks by instead supplying hydrocarbon feedstocks such as propane ($C_3H_8$) and toluene ($C_7H_8$). Likewise, although the structures described are seen to be agglomerates, fullerenes and other carbon nanostructures can be obtained by this method. For example, by applying toluene and acetone solutions to the fluorinated carbon produced by the pyrolysis of HFC-134a, a deep orange-coloured solution is obtained, which is observed to fluoresce. The colour change is probably a result of the presence of fullerene-type material.

Moreover, it is possible to add a dopant material such as oxygen, chlorine or nitrogen to the fluorinated carbon material.

The ranges of microwave power and feedstock flow rates are merely typical examples and are not to be considered limiting.

What is claimed is:

1. A process for producing a fluorinated carbon material comprising the steps of:
   generating a plasma in a plasma chamber; and
   supplying a fluorocarbon or a fluorocarbon containing mixture to the plasma whereby at least some of the fluorocarbon transforms by direct pyrolysis to a fluorinated carbon material which comprises or consists of fluorinated carbon black (FCB having the general formula $CF_x$, where x is $\geq 0.8$ and is in the form of nanometer sized particles and/or agglomerates thereof.

2. A process as claimed in claim 1, in which the step of generating a plasma comprises:
   supplying a plasma-forming fluid to an input of the plasma chamber;
   flowing the plasma-forming fluid to a plasma region of the plasma chamber; and
   supplying electromagnetic energy to the plasma chamber so as to maintain the said plasma from the plasma-forming fluid, in the said plasma region.

3. A process as claimed in claim 2, in which the step of generating a plasma further comprises concentrating the electromagnetic energy so as to establish the plasma.

4. A process as claimed in claim 2, in which the step of flowing the plasma forming fluid to the plasma region comprises passing the plasma-forming fluid through a fluid manifold, which manifold is adapted to introduce vortical motion into the plasma-forming fluid downstream of the plasma chamber input.

5. A process as claimed in claim 2, wherein the plasma-forming fluid comprises or consists of an inert gas.

6. A process as claimed in claim 5, wherein the plasma-forming fluid comprises or consists of helium and/or argon.

7. A process as claimed in claim 2, wherein the plasma-forming fluid comprises or consists of nitrogen or a nitrogen-containing gas.

8. A process as claimed in claim 2, wherein the electromagnetic energy has a frequency in the RF or microwave range, and wherein the output power is between 2.5 and 3.5 kW.

9. A process as claimed in claim 2, wherein the plasma forming fluid is supplied at a rate of between 20 and 40 liters/minute.

10. A process as claimed in claim 1, further comprising mixing the supplied fluorocarbon or fluorocarbon-containing mixture with the plasma in a mixing chamber forming a part of the plasma chamber.

11. A process as claimed in claim 1, wherein the fluorocarbon is perfluorinated or partially fluorinated.

12. A process as claimed in claim 11, wherein the fluorocarbon consists of or the fluorocarbon containing mixture comprises 1,1,1,2-tetrafluoroethane (HFC-134a), hexafluorobenzene ($C_6F_6$) or perfluoromethylcyclohexane ($C_7F_{14}$), including mixtures of two or more thereof.

13. A process as claimed in claim 1, wherein the plasma is maintained at a pressure which is substantially at or above atmospheric pressure.

14. A process as claimed in claim 1, wherein x is between 0.05 and 0.30.

15. A process as claimed in claim 14, wherein x is between 0.06 and 0.15.

16. A process as claimed in claim 1, wherein the fluorinated carbon material also includes a dopant selected from one or more of chlorine, nitrogen and oxygen.

* * * * *